United States Patent [19]

Joyce

[11] 4,394,354
[45] Jul. 19, 1983

[54] SILVER REMOVAL WITH HALOGEN IMPREGNATED ACTIVATED CARBON

[75] Inventor: Ronald S. Joyce, Pittsburgh, Pa.

[73] Assignee: Calgon Carbon Corporation, Pittsburgh, Pa.

[21] Appl. No.: 305,889

[22] Filed: Sep. 28, 1981

[51] Int. Cl.³ .............................................. C22B 11/00
[52] U.S. Cl. ................................... 423/25; 75/118 P; 75/118 R; 252/415; 252/441; 252/444; 210/684; 210/753; 210/688
[58] Field of Search ............ 423/25; 75/118 R, 118 P, 75/83; 252/415, 441, 444, 447; 210/688, 753, 501, 684

[56] References Cited

U.S. PATENT DOCUMENTS

| | | |
|---|---|---|
| 1,617,533 | 2/1927 | Mahler ................................ 252/415 |
| 1,685,204 | 9/1928 | Schreier .............................. 210/501 |
| 2,543,792 | 10/1949 | Marasco et al. ..................... 210/688 |
| 2,614,029 | 2/1951 | Moede ................................ 75/118 P |
| 3,294,572 | 12/1966 | Piccoine et al. ...................... 117/47 |
| 4,026,784 | 5/1977 | Rivers ................................. 204/273 |
| 4,040,802 | 8/1977 | Deitz et al. .............................. 55/71 |
| 4,056,261 | 11/1977 | Darrah ................................. 266/101 |
| 4,072,479 | 2/1978 | Sinha et al. .............................. 55/73 |
| 4,075,282 | 2/1978 | Storp et al. .......................... 423/230 |
| 4,111,766 | 9/1978 | Idota et al. ........................... 204/109 |
| 4,131,454 | 12/1978 | Piret et al. .............................. 75/83 |
| 4,166,781 | 9/1979 | Staples ............................... 204/109 |

FOREIGN PATENT DOCUMENTS 43-8004065 10/1968 Japan ......................................... 15/8

OTHER PUBLICATIONS

Habashi, Fathi, *Extractive Metallurgy*, vol. 2, 1970, pp. 183–193.

*Primary Examiner*—O. R. Vertiz
*Assistant Examiner*—Robert L. Stoll
*Attorney, Agent, or Firm*—Martin L. Katz; R. Brent Olson; Ernest V. Linek

[57] ABSTRACT

The removal of silver from photographic and other solutions using halogen impregnated activated carbon is described.

6 Claims, No Drawings

SILVER REMOVAL WITH HALOGEN IMPREGNATED ACTIVATED CARBON

BACKGROUND OF THE INVENTION

This invention is directed to the removal of ionic silver from solutions using halogen impregnated activated carbon. Said solutions are usually aqueous; however, non-aqueous solutions containing silver metal complexes are also within the scope of the instant invention.

This invention is especially directed to the removal of ionic silver from photographic processing solutions such as, developers, fixers, bleach fixers and washwaters by contacting said solutions with a quantity of halogen impregnated activated carbon.

The term "ionic silver" as used herein, is defined as including both the cationic form of silver, $Ag^+$, the anionic silver thiosulfate complex, $[Ag(S_2O_3)_2]^{-3}$, and other soluble silver metal complexes.

Activated carbon has long been used as an adsorbent for removing metal ions from solutions. Carbon has been used in gold mining operations for the adsorption of $Au(CN)_2^-$, gold-cyanide since about 1880. The activated carbon is generally believed to act as a reducing agent, for example, adding an electron to the cationic metal ($M^+$) to form the elemental metal ($M°$). For example, the red-ox potential for the reduction of silver ($Ag^+$) is high, $E° = 0.8$ V and a weak reducing agent is sufficient for carrying out the reaction. The elemental silver ($Ag°$) is then loosely bound to the activated carbon surface.

Darrah, in U.S. Pat. No. 4,056,261 describes the use of activated carbon, dilute cyanide and dilute caustic for the recovery of both gold and silver from mine-run dumps or low-grade crushed ores.

The silver complex present in most photographic processing solutions is known to exist as a stable, soluble silver-thiosulfate complex. The red-ox potential for the reduction of this complex to elemental silver is quite low, $E° = 0.01$ V. Because of the low red-ox potential a strong reducing agent is necessary to carry out the reduction reaction. Standard activated carbon is known to be a weak reducing agent and is ineffective for carrying out the reduction reaction. Due to this inability of standard activated carbon to reduce the complex the carbon has essentially no affinity for adsorbing the silver-thiosulfate complex.

Generally, the ionic silver present in photographic processing solutions is recovered by electrolytic methods. Generally, electrolytic recovery of ionic silver is useful only for ionic silver concentrations greater than 500 ppm. Typical electrolytic processes are described in U.S. Pat. Nos. 4,166,781; 4,111,766; and 4,026,784.

The disadvantages of the electrolytic method of silver removal from photographic solutions include; reducing the ionic silver concentration to below 500 ppm is difficult, capital expenditure for an electrolytic system is high, the system requires continuous monitoring and in addition to silver collecting at the cathode, the thiosulfate anion can be reduced to sulfide ion which immediately reacts with silver to form silver sulfide. This silver sulfide precipitate reduces the purity of the recovered silver.

Piret et al., in U.S. Pat. No. 4,131,451 describe the recovery of gold and silver from a chloride solution of these and other metals with the use of activated carbon and an aqueous iodide solution. The gold is immediately adsorbed by the carbon and iodide causes precipitation of silver compounds that are then separated from the gold-laden carbon. Critical in this process are the parameters of pH, temperature and oxidation capacity of the chloride solution.

Impregnated activated carbons are useful for adsorbing compounds that are either poorly adsorbed or not adsorbed at all by standard activated carbon. Carbon has been impregnated with NaOH (U.S. Pat. No. 4,072,479), silver (U.S. Pat. No. 3,294,572), tertiary amines with either bromine or iodine (U.S. Pat. No. 4,040,802), iodine alone (U.S. Pat. No. 4,075,282), and sulfur radicals (Japanese Kokai Koho 78,040,065).

SUMMARY OF THE INVENTION

It has been discovered that halogen impregnated activated carbons are useful in the adsorption of ionic silver from aqueous photographic and other solutions. As used herein, the term "halogen" refers to iodine, bromine and chlorine (including any combination of iodine, bromine and chlorine). These impregnated activated carbons possess an adsorption affinity for the cationic ($Ag^+$) form, the anionic ($[Ag(S_2O_3)_2]^{-3}$) form and other ionic complexes of silver.

Iodine and/or bromine impregnated carbons overcome the problem associated with standard unimpregnated activated carbons for adsorbing silver-thiosulfate complex and are most useful in removing all forms of ionic silver from low concentration solutions to a level below that attainable by the electrolytic techniques.

This invention is directed toward a process for the removal of ionic silver from a solution using halogen impregnated activated carbon. This invention is especially suited for removal of ionic silver from solution wherein the electrolytic methods are not practicable, that is, at ionic silver concentrations of less than 500 ppm.

Thus there is provided a process for removing ionic silver from a solution which comprises contacting said solution with a halogen impregnated activated carbon containing at least 0.1 weight percent of halogen. The combination of the halogen impregnated adsorbent and the adsorbed, reduced ionic silver species may be further treated to recover the adsorbed silver.

DETAILED DESCRIPTION

The process of the present invention involves the removal of ionic silver from a solution by a halogen impregnated activated carbon. Selection of a suitable activated carbon starting material for use in this process will largely be within the ordinary skill of the artisan. As stated above, all activated carbons capable of being impregnated with halogen are deemed to be within the scope of the instant invention.

Typically, activated carbons are impregnated with halogen by admixing the halogen in a solution with the adsorbent to form a slurry and any unadsorbed halogen plus the solvent are removed by filtration.

The impregnated activated carbon may be employed in any conventional system as a trap for ionic silver. This includes an in-line filter system, a column arrangement, or as a reagent added to a solution to form a slurry.

An example of one useful carbon is the PCB granular activated carbon manufactured by the Pittsburgh Activated Carbon Company, Pittsburgh, Pennsylvania. PCB carbon has a minimum iodine number of 1200, total surface area of 1150–1250 m$^2$/g (N$_2$, BET Method) and a minimum hardness number of 92.

Activated carbon may be impregnated with either bromine or iodine, or both, but iodine is preferred. The concentration of halogen impregnated on the carbon may vary from a fraction of 1 weight percent to as high as 100 weight percent, while the preferred concentration range is about 5 weight percent to about 50 weight percent. The most preferred concentration is about 10 weight percent. The halogen impregnation of the activated carbon may be carried out by any of the known processes which effectively impregnate the carbon.

The amount of carbon used to remove ionic silver from an aqueous solution will vary depending upon the amount of halogen present on the carbon, and the ionic silver concentration in the solution. Generally, when employing activated carbon impregnated 10 percent with halogen, a minimum about of carbon to solution of 1 gram per 100 ml is employed. The contact time required to achieve reduction of the ionic silver to silver compounds also varies depending upon the amount of carbon used, the concentration of halogen on the carbon and the ionic silver reduction and hence, concentration in the solution. Generally, ionic silver adsorption is rapid, especially at low initial ionic silver concentrations. However, for very high concentrations the reduction reaction, and therefore the adsorption process is notably slower. The reduction reactions of ionic silver complexes are reversible (albeit not completely) and this factor generally places a maximum time limit on the optimum contact time between the carbon and the solution after reduction. This too, varies with conditions, but there will usually be appreciable reversal of the reaction after several hours of exposure. It will be understood by those skilled in the art of carbon adsorption that the described parameters may vary somewhat depending on the actual conditions under which the process of the present invention is employed.

Silver removal from solution may be monitored by any known analytical technique. After the impregnated carbon has been saturated with reduced silver species, no more ionic silver will be adsorbed—this is known as the breakthrough point. At, or before, this breakthrough point these reduced, adsorbed silver compounds may be recovered from the carbon and the carbon either regenerated or discarded. Since the silver thiosulfate complex reaction is reversible, sodium thiosulfate solution may be used to redissolve the silver compounds adsorbed on the carbon. The resulting solution, enriched in ionic silver, may then be passed through an electrolytic cell for the recovery of purified elemental silver. Another silver recovery technique involves the ashing of the saturated carbon. The carbon is heated and destroyed, leaving the silver compounds for further purification.

The following examples will more completely illustrate the practice of this invention. It will be readily understood by those skilled in the art that these examples should not be construed as limiting the scope of this invention in any way.

Adsorption experiments are generally conducted in a 250 ml Erlenmeyer flask using a variable amount of halogen impregnated carbon and various dilutions of aqueous synthetic photographic silver-thiosulfate solution. Analysis for aqueous silver concentration is accomplished using atomic adsorption; wavelength 3281 A, hollow cathode current 6 ma, slit size 3 A and an oxidizing air acetylene flame.

EXAMPLE I (a) Activated carbon is impregnated with 10 weight percent iodine by adding 20 grams of 12x20 mesh PCB carbon to a solution of 2 grams I$_2$ in ethanol. The mixture is agitated, 50 ml water is added and the volume is reduced to about 50 ml by heating. The carbon is removed by filtration and dried for 2 hours at 120° C. The filtrate is found to be free of iodine.

(b) The 10% iodine impregnated PCB carbon, 1.038 grams, is admixed with 105 ml of synthetic aqueous photographic silver-thiosulfate solution. Initial aqueous silver concentration is 69 ppm silver. After 60 minutes agitation at room temperature the silver concentration is 3.4 ppm (95% removed). After 18 hours the silver concentration is 68 ppm. (2% removed).

EXAMPLE II

The iodine impregnated PCB carbon of Example I(a), 1.115 grams, is admixed with 100 ml of synthetic aqueous photographic silver-thiosulfate solution. Initial aqueous silver concentration is 3450 ppm silver. After 60 minutes agitation at room temperature the silver concentration is 2233 ppm (35% removed).

EXAMPLE III

The iodine impregnated PCB carbon of Example I(a), 1.113 grams, is admixed with 200 ml of synthetic aqueous photographic silver-thiosulfate solution. Initial aqueous silver concentration is 0.73 ppm. After 18 minutes agitation at room temperature the silver concentration is 0.24 ppm (67% removed).

The results of Examples I–III are summarized below in Table I.

TABLE I

| | SILVER REMOVAL** VS. TIME Silver Concentration (ppm) | | |
|---|---|---|---|
| Time (min.) | Example | | |
| | I | II | III |
| 0 | 69 | 3450 | 0.73 |
| 5 | 38.5 | * | 0.33 |
| 10 | 27.9 | 3168 | * |
| 18 | * | * | 0.24 |
| 40 | 14.1 | * | * |
| 45 | * | * | * |
| 60 | 3.4 | 2233 | * |

*silver concentration not measured**using iodine impregnated activated carbon as adsorbent

What is claimed is:

1. A process for removing the anionic silver thiosulfate complex from an aqueous solution comprising contacting said solution with halogen impregnated activated carbon containing at least 0.1 weight percent halogen, said halogen being selected from the group consisting of iodine, bromine or any combination of iodine and bromine.

2. The process of claim 1 wherein the halogen impregnated activated carbon contains from about 5 to 50 weight percent of iodine, bromine, or the combination of iodine and bromine.

3. The process of claim 2 wherein the halogen impregnated activated carbon contains about 10 weight percent of iodine, bromine or the combination of iodine and bromine.

4. The process of claim 3 which further comprises contacting said solution and said impregnated activated carbon up to breakthrough.

5. The process of claim 1 wherein the aqueous silver-thiosulfate complex concentration is less than 500 ppm.

6. The process of claims 1 or 2 or 3 or 4 wherein the halogen is iodine.

* * * * *